United States Patent
Ji et al.

(10) Patent No.: US 11,704,157 B2
(45) Date of Patent: Jul. 18, 2023

(54) METHOD AND APPARATUS FOR COMPARING ACQUIRED CLOUD RESOURCE USE INFORMATION TO THRESHOLDS TO RECOMMEND A TARGET CLOUD RESOURCE INSTANCE

(71) Applicant: BEIJING BAIDU NETCOM SCIENCE AND TECHNOLOGY CO., LTD., Beijing (CN)

(72) Inventors: Chaoping Ji, Beijing (CN); Xiaoxu Chen, Beijing (CN); Tao Yang, Beijing (CN); Xiang Gao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 120 days.

(21) Appl. No.: 17/022,026

(22) Filed: Sep. 15, 2020

(65) Prior Publication Data
US 2021/0279109 A1  Sep. 9, 2021

(30) Foreign Application Priority Data

Mar. 9, 2020  (CN) .......................... 202010157552.9

(51) Int. Cl.
    *G06F 9/50* (2006.01)
(52) U.S. Cl.
    CPC .......... *G06F 9/5027* (2013.01); *G06F 9/5072* (2013.01); *G06F 9/5077* (2013.01);
    (Continued)
(58) Field of Classification Search
    CPC .... G06F 9/5027; G06F 9/5072; G06F 9/5077; G06F 2209/5021; G06F 2209/5022;
    (Continued)

(56) References Cited

U.S. PATENT DOCUMENTS 10,587,490 B2 * 3/2020 Smola .................. H04L 43/026
10,942,763 B2 * 3/2021 Higuchi .............. G06F 9/45558
(Continued)

FOREIGN PATENT DOCUMENTS

CN          104426876 A  *  3/2015
CN          105426254 A      3/2016
(Continued)

OTHER PUBLICATIONS

Kim, KR20170001792A Description Translation, Jan. 5, 2017, [database online], [retrieved on Oct. 21, 2022] Retrieved from Espacenet using Internet <URL:https://worldwide.espacenet.com/publicationDetails/description?CC=KR&NR=20170001792A&KC=A&FT=D&ND=3&date=20170105&DB=&locale=en_EP>, pp. 1-11 (Year: 2017).*

(Continued)

*Primary Examiner* — Meng Ai T An
*Assistant Examiner* — Hsing Chun Lin
(74) *Attorney, Agent, or Firm* — Cozen O'Connor (57) ABSTRACT

Embodiments of the present disclosure disclose a method and apparatus for acquiring information. The method may include: acquiring cloud resource use information; comparing the cloud resource use information with a use rate threshold value, to obtain a comparison result; obtaining use state information of a cloud resource corresponding to the cloud resource use information according to the comparison result; and generating cloud resource state information based on the use state information.

9 Claims, 7 Drawing Sheets

(52) U.S. Cl.
CPC .............. *G06F 2209/5021* (2013.01); *G06F 2209/5022* (2013.01)

(58) Field of Classification Search
CPC ........ G06F 11/301; H04L 43/16; H04L 67/10; H04L 41/0631; H04L 41/0823; H04L 67/025; H04L 67/1097; H04L 47/822
See application file for complete search history.

(56) References Cited

U.S. PATENT DOCUMENTS

| | | | |
|---|---|---|---|
| 2011/0055385 A1 | 3/2011 | Tung et al. | |
| 2011/0055399 A1* | 3/2011 | Tung | G06F 3/0481 709/226 |
| 2013/0054426 A1* | 2/2013 | Rowland | G06F 9/5072 718/1 |
| 2014/0317265 A1 | 10/2014 | James et al. | |
| 2015/0271145 A1* | 9/2015 | Jalisatgi | H04L 67/42 713/168 |
| 2018/0139108 A1 | 5/2018 | Fulton et al. | |
| 2019/0020711 A1 | 1/2019 | Alfieri et al. | |

FOREIGN PATENT DOCUMENTS

| | | | |
|---|---|---|---|
| CN | 107612737 A | | 1/2018 |
| CN | 107872499 A | * | 4/2018 |
| CN | 110138883 A | | 8/2019 |
| KR | 20170001792 A | * | 1/2017 |
| WO | WO 2012029289 A1 | | 3/2012 |

OTHER PUBLICATIONS

Huang et al. CN104426876A Description Translation, Mar. 18, 2015, [database online], [retrieved on Oct. 21, 2022] Retrieved from Espacenet using Internet <URL:https://worldwide.espacenet.com/publicationDetails/description?CC=CN&NR=104426876A&KC=A&FT=D&ND=3&date=20150318&DB=&locale=en_EP>, pp. 1-46 (Year: 2015).*

Shen, CN107872499A Description Translation, 2018-04-03, [database online], [retrieved on 2022-10-21] Retrieved from Espacenet using Internet <URL:https://worldwide.espacenet.com/publicationDetails/description?CC=CN&NR=107872499A&KC=A&FT=D&ND =3&date=20180403&DB=&locale=en_EP>, pp. 1-36 (Year: 2018).*

Su, CN107612737A Description Translation, Jan. 19, 2018, [database online], [retrieved on Oct. 21, 2022] Retrieved from Espacenet using Internet <URL:https://worldwide.espacenet.com/publicationDetails/description?CC=CN&NR=107612737A&KC=A&FT=D&ND =3&date=20180119&DB=&locale=en_EP>, pp. 1-12 (Year: 2018).*

Espadas et al., A tenant-based resource allocation model for scaling Software-as-a-Service applications over cloud computing infrastructures, Jan. 2013, [retrieved on Mar. 10, 2023], <URL:https://www.sciencedirect.com/science/article/pii/S0167739X1100210X>, pp. 273-286 (Year: 2013).*

Mosa et al, Dynamic Virtual Machine Placement Considering CPU and Memory Resource Requirements, Jul. 2019, [retrieved on Mar. 10, 2023],<URL:https://ieeexplore.IEEE.org/stamp/stamp.jsp?tp=&arnumber=8814574>, pp. 196-198 (Year: 2019).*

European Patent Application No. 21159644.0, Extended European Search Report dated Aug. 3, 2021, 7 pages.

Japanese Patent Application No. 2021-037399 Notice of Reason for Refusal dated Jul. 5, 2022, 3 pages.

English Translation Japanese Patent Application No. 2021-037399 Notice of Reason for Refusal dated Jul. 5, 2022, 3 pages.

Chinese Patent Application No. 202010157552.9 First Office Action dated Apr. 26, 2022, 7 pages.

English Translation of Chinese Patent Application No. 202010157552.9 First Office Action dated Apr. 26, 2022, 11 pages.

* cited by examiner

METHOD AND APPARATUS FOR COMPARING ACQUIRED CLOUD RESOURCE USE INFORMATION TO THRESHOLDS TO RECOMMEND A TARGET CLOUD RESOURCE INSTANCE

CROSS-REFERENCE TO RELATED APPLICATIONS

This application claims priority to Chinese Application No. 202010157552.9, filed on Mar. 9, 2020 and entitled "Method and Apparatus for Acquiring Information," the entire disclosure of which is hereby incorporated by reference.

TECHNICAL FIELD

Embodiments of the present disclosure relate to the field of cloud computer technology, and specifically to a method and apparatus for acquiring information.

BACKGROUND

Cloud resources contain massive information. When a user operates on the cloud resources, a plurality of correlations between the cloud resources are involved. Generally, the correlations between the cloud resources may be generated before the user operates on the cloud resources, or may be generated after the user operates on the cloud resources.

SUMMARY

Embodiments of the present disclosure propose a method and apparatus for acquiring information.

In a first aspect, an embodiment of the present disclosure provides a method for acquiring information, the method including: acquiring cloud resource use information, the cloud resource use information being used to represent a use rate of a corresponding cloud resource within set time; comparing the cloud resource use information with a use rate threshold value, to obtain a comparison result; obtaining use state information of the cloud resource corresponding to the cloud resource use information according to the comparison result; and generating cloud resource state information based on the use state information.

In a second aspect, an embodiment of the present disclosure provides an apparatus for acquiring information, the apparatus including: an information acquiring unit, configured to acquire cloud resource use information, the cloud resource use information being used to represent a use rate of a corresponding cloud resource within set time; an information comparing unit, configured to compare the cloud resource use information with a use rate threshold value, to obtain a comparison result; a use state information acquiring unit, configured to obtain use state information of the cloud resource corresponding to the cloud resource use information according to the comparison result; and a cloud resource state information acquiring unit, configured to generate cloud resource state information based on the use state information.

In a third aspect, an embodiment of the present disclosure provides an electronic device, the device electronic including: one or more processors; and a storage device, for storing one or more programs, where the one or more programs, when executed by the one or more processors, cause the one or more processors to implement the method for acquiring information according to the first aspect.

In a fourth aspect, an embodiment of the present disclosure provides a computer readable medium, storing a computer program thereon, where the computer program, when executed by a processor, implements the method for acquiring information according to the first aspect.

According to the method and apparatus for acquiring information provided in embodiments of the present disclosure, the cloud resource use information is first acquired. Then, the cloud resource use information is compared with the use rate threshold value to obtain the comparison result, and the cloud resource use information that needs data processing is determined. Next, according to the comparison result, the use state information of the cloud resource corresponding to the cloud resource use information is obtained. The state in which the user uses the cloud resource is ascertained. Finally, the cloud resource state information is generated according to the use state information. In this way, it is conductive to improving the security when the user uses the cloud resource and the utilization rate of the cloud resource.

BRIEF DESCRIPTION OF THE DRAWINGS

After reading detailed descriptions for non-limiting embodiments given with reference to the following accompanying drawings, other features, objectives and advantages of the present disclosure will be more apparent.

DETAILED DESCRIPTION OF EMBODIMENTS

Embodiments of present disclosure will be described below in detail with reference to the accompanying drawings. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that some embodiments in the present disclosure and some features in the disclosure may be combined with each other on a non-conflict basis. Features of the present disclosure will be described below in detail with reference to the accompanying drawings and in combination with embodiments.

Figure 1:
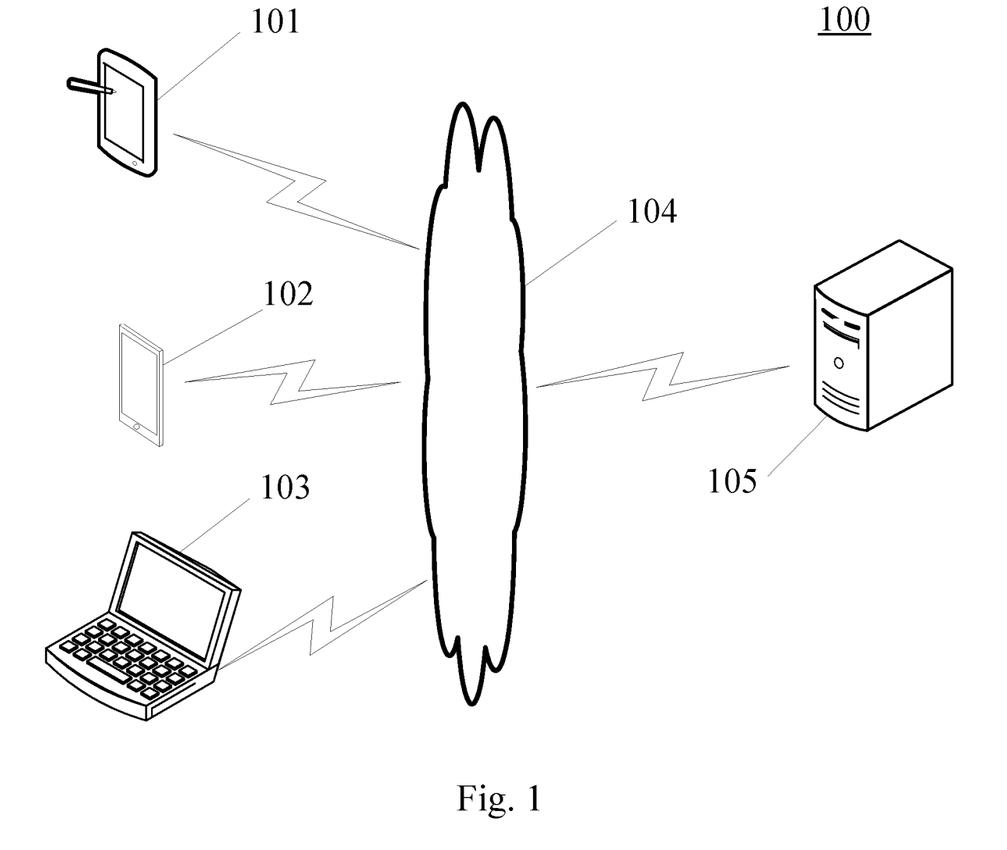
FIG. 1 is a diagram of an example system architecture in which an embodiment of the present disclosure may be applied.

FIG. 1 illustrates an example system architecture 100 in which a method for acquiring information or an apparatus for acquiring information according to embodiments of the present disclosure may be applied.

As shown in FIG. 1, the system architecture 100 may include terminal devices 101, 102 and 103, a network 104 and a cloud resource server 105. The network 104 serves as a medium providing a communication link between the terminal devices 101, 102 and 103 and the cloud resource server 105. The network 104 may include various types of connections, for example, wired or wireless communication links, or optical fiber cables.

A user may interact with the cloud resource server 105 via the network 104 using the terminal devices 101, 102 and 103, to receive or send a message, etc. Various data communication client applications (e.g., a cloud resource access application, a cloud resource search application, a cloud resource download application and a cloud resource operation application) may be installed on the terminal devices 101, 102 and 103.

The terminal devices 101, 102 and 103 may be hardware or software. When being the hardware, the terminal devices 101, 102 and 103 may be various electronic devices having a display screen and supporting cloud resource processing, the electronic devices including, but not limited to, a smart phone, a tablet computer, a laptop portable computer, a desktop computer, etc. When being the software, the terminal devices 101, 102 and 103 may be installed in the above listed electronic devices. The terminal devices may be implemented as a plurality of pieces of software or a plurality of software modules (e.g., software or software modules for providing a distributed service), or may be implemented as a single piece of software or a single software module, which will not be specifically defined here.

The cloud resource server 105 may be a server providing various services, for example, a server processing cloud resource use information of the user of the terminal devices 101, 102 and 103. The server may process (e.g., analyze) received data (e.g., cloud resource use information), and feed back the processing result (e.g., cloud resource state information) to the terminal devices.

It should be noted that the method for acquiring information provided in embodiments of the present disclosure is generally performed by the cloud resource server 105. Correspondingly, the apparatus for acquiring information is generally provided in the cloud resource server 105.

It should be noted that the cloud resource server 105 may be hardware or software. When being the hardware, the cloud resource server 105 may be implemented as a distributed server cluster composed of a plurality of cloud resource servers, or may be implemented as a single server. When being the software, the cloud resource server 105 may be implemented as a plurality of pieces of software or a plurality of software modules (e.g., software or software modules for providing a distributed service), or may be implemented as a single piece of software or a single software module, which will not be specifically defined here.

It should be appreciated that the numbers of the terminal devices, the networks and the cloud resource servers in FIG. 1 are merely illustrative. Any number of terminal devices, networks and cloud resource servers may be provided based on actual requirements.

Figure 2:
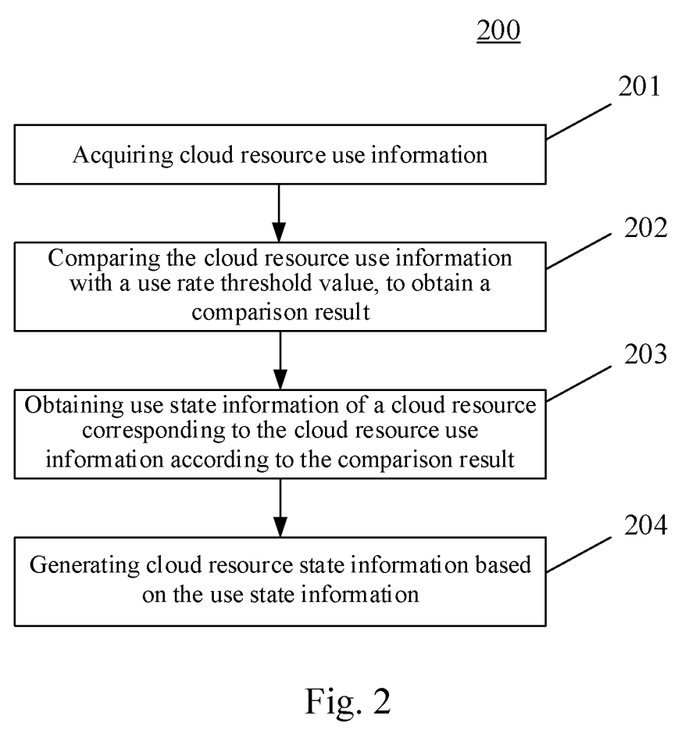
FIG. 2 is a flowchart of a method for acquiring information according to an embodiment of the present disclosure.

Further referring to FIG. 2, FIG. 2 illustrates a flow 200 of a method for acquiring information according to an embodiment of the present disclosure. The method for acquiring information includes the following steps.

Step 201, acquiring cloud resource use information.

In this embodiment, an executing body (e.g., the cloud resource server 105 shown in FIG. 1) of the method for acquiring information may acquire, by means of a wired connection or a wireless connection, the cloud resource use information from a terminal by which a user performs a cloud resource operation. The cloud resource use information may be sent by the user to the executing body through the terminal devices 101, 102 or 103, or obtained by periodically querying the cloud data of the user by the executing body.

Step 202, comparing the cloud resource use information with a use rate threshold value, to obtain a comparison result.

The executing body may compare the cloud resource use information with the use rate threshold value, and then determine whether the cloud resource use information has a possibility of affecting the security and the use efficiency of a cloud resource. The use rate threshold value is generally set to be small, to facilitate a basic determination for the cloud resource use information.

Step 203, obtaining use state information of a cloud resource corresponding to the cloud resource use information according to the comparison result.

After obtaining the comparison result higher than the use rate threshold value, the executing body may perform further data processing on the comparison result to obtain the use state information of the cloud resource of the cloud resource use information. Here, the use state information is any one of normal, warning or high-risk.

Step 204, generating cloud resource state information based on the use state information.

After determining the use state information of the cloud resource, the executing body may perform matching on the use state information, and thus may generate the cloud resource state information of the user. Here, the matching may be performed according to the priority of the cloud resource on the cloud resource server 105, the use rate of the cloud resource on the cloud resource server 105, or the like. For example, when the matching is performed on the use state information according to the priority of the cloud resource on the cloud resource server 105, the cloud resource state information of the user may be ascertained according to the number and the proportion of the priorities of each piece of use state information of the user. Similarly, the cloud resource state information of the user may be ascertained according to the use rate of the cloud resource on the cloud resource server 105.

Figure 3:
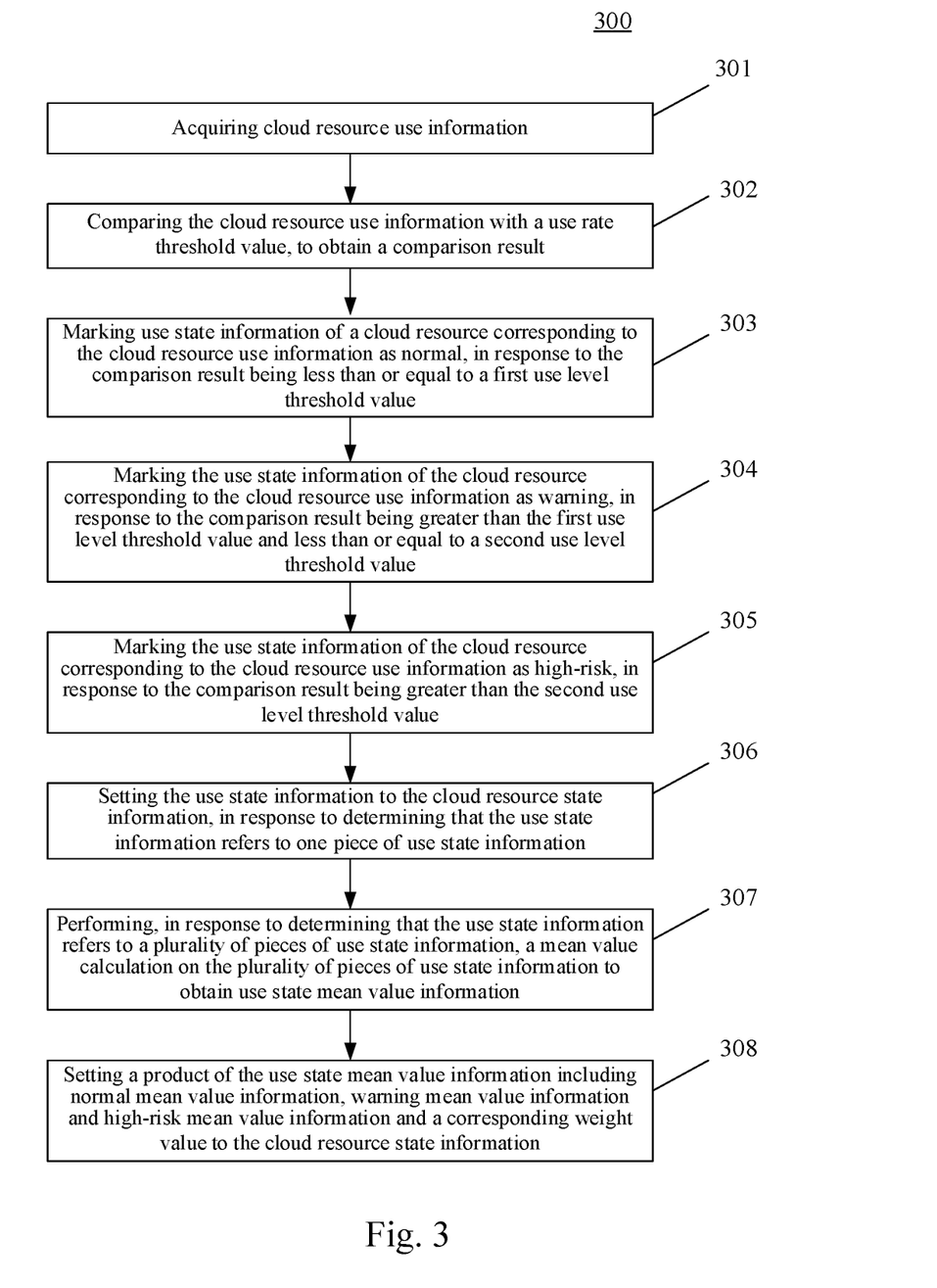
FIG. 3 is a flowchart of the method for acquiring information according to another embodiment of the present disclosure.

Further referring to FIG. 3, FIG. 3 illustrates a flow 300 of the method for acquiring information according to an embodiment of the present disclosure. The method for acquiring information includes the following steps.

Step 301, acquiring cloud resource use information.

In this embodiment, an executing body (e.g., the cloud resource server 105 shown in FIG. 1) of the method for acquiring information may acquire, by means of a wired connection or a wireless connection, the cloud resource use information from a terminal by which a user performs a cloud resource operation. It should be noted that the wireless connection may include, but not limited to, a 3G/4G connection, a WiFi connection, a Bluetooth connection, a WiMAX connection, a Zigbee connection, a UWB (ultra wideband) connection, and other wireless connections now known or developed in the future.

In the existing technology, the user may acquire cloud resources according to his own needs. There may be a correlation between different cloud resources. For example, the correlation may be the sharing of information, the reference relationship and exclusion relationship of data, etc. However, the user generally does not have the permission to query the correlation between the cloud resources, and does not have the permission to modify the correlation between the cloud resources. Thus, the data security when the user uses the cloud resources is affected, and the utilization rate of the cloud resources is reduced.

To this end, the executing body of the present disclosure may acquire at least one piece of cloud resource use information of the user when detecting that the user accesses the cloud resource. Here, the cloud resource use information may be used to represent a use rate of a corresponding cloud resource within set time.

Step 302, comparing the cloud resource use information with a use rate threshold value, to obtain a comparison result.

After obtaining the cloud resource use information of the user, the executing body may compare the cloud resource use information with the corresponding use rate threshold value to obtain the comparison result corresponding to the cloud resource use information. Here, the comparison result may be higher than the use rate threshold value or lower than the use rate threshold value. Here, the use rate threshold value is used to represent the cloud resource use information.

When the comparison result is lower than the use rate threshold value, it indicates that the cloud resource use information does not affect the cloud resource basically, and thus, the executing body may not further process the cloud resource use information. When the comparison result is higher than the use rate threshold value, it indicates that the cloud resource use information may affect the cloud resource, and thus, the executing body needs to further process the cloud resource use information.

Step 303, marking use state information of a cloud resource corresponding to the cloud resource use information as normal, in response to the comparison result being less than or equal to a first use level threshold value.

The executing body may compare the comparison result with the corresponding first use level threshold value and a corresponding second use level threshold value. When the comparison result is less than or equal to the first use level threshold value, it indicates that the corresponding cloud resource is not frequently used and does not affect other cloud resources. At this time, the executing body may mark the use state information of the cloud resource corresponding to the cloud resource use information as normal. Otherwise, step 304 is performed.

Step 304, marking the use state information of the cloud resource corresponding to the cloud resource use information as warning, in response to the comparison result being greater than the first use level threshold value and less than or equal to a second use level threshold value.

When the comparison result is greater than or equal to the first use level threshold value and less than or equal to the second use level threshold value, it indicates that the use frequency of the cloud resource corresponding to the cloud resource use information is not high, and thus the cloud resource does not affect other cloud resources basically or has little impact on other cloud resources. At this time, the executing body may mark the use state information of the cloud resource corresponding to the cloud resource use information as warning. Otherwise, step 305 is performed.

Step 305, marking the use state information of the cloud resource corresponding to the cloud resource use information as high-risk, in response to the comparison result being greater than the second use level threshold value.

When the comparison result is greater than or equal to the second use level threshold value, it indicates that the use frequency of the cloud resource corresponding to the cloud resource use information is high, and thus, the possibility of affecting the other cloud resources is high. At this time, the executing body may mark the use state information of the cloud resource corresponding to the cloud resource use information as high-risk. In this way, the use state of the corresponding cloud resource can be qualitatively ascertained through the use state information, which facilitates the determination for the security of the cloud resource.

Step 306, setting the use state information to the cloud resource state information, in response to determining that the use state information refers to one piece of use state information.

When there is only one cloud resource, there is only one piece of use state information correspondingly. At this time, the executing body may directly set the use state information to the cloud resource state information of the user. Thus, the data processing for the cloud resource state information is simplified.

Step 307, performing, in response to determining that the use state information refers to a plurality of pieces of use state information, a mean value calculation on the plurality of pieces of use state information to obtain use state mean value information.

When there are the plurality of pieces of use state information, the executing body may perform the mean value calculation on the plurality of pieces of use state information to obtain the use state mean value information. The use state information includes normal, warning and high-risk, and the corresponding use state mean value information may include normal mean value information, warning mean value information, and high-risk mean value information.

Step 308, setting a product of the use state mean value information including the normal mean value information, the warning mean value information and the high-risk mean value information and a corresponding weight value to the cloud resource state information.

Different use state mean value information may be set with different weight values. A weight value may be used to represent the importance of the corresponding use state mean value information. The executing body may respectively multiply the mean value information by the corresponding weight values, and then calculate the sum, to obtain the cloud resource state information of the user. The cloud resource state information may represent the data security and the utilization rate of the current cloud resource of the user.

Figure 4:
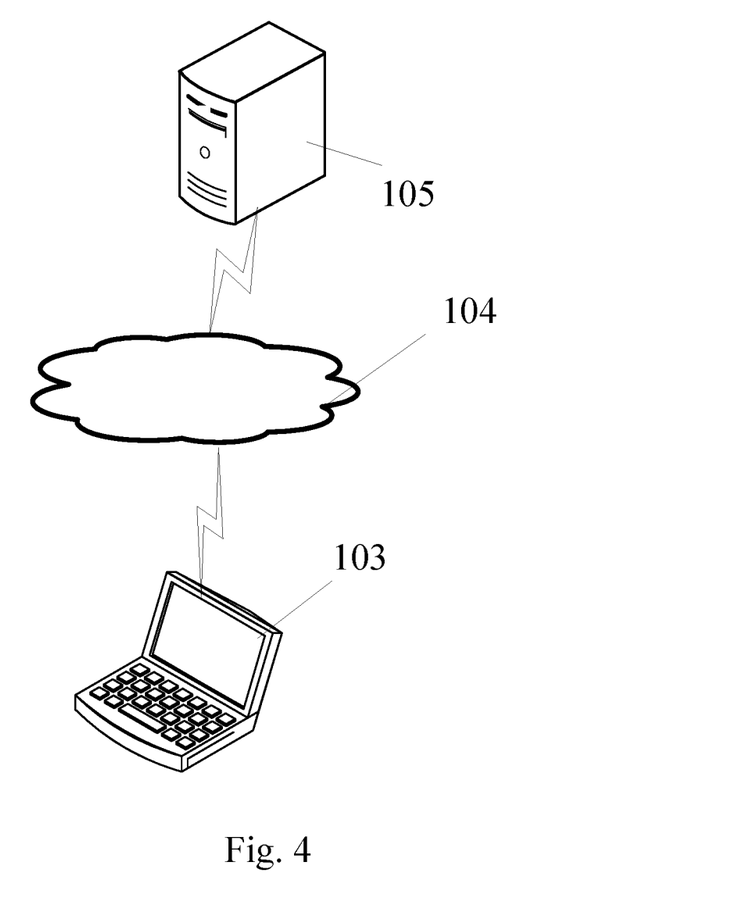
FIG. 4 is a schematic diagram of an application scenario of the method for acquiring information according to the present disclosure.

Further referring to FIG. 4, FIG. 4 is a schematic diagram of an application scenario of the method for acquiring information according to this embodiment. In the application scenario of FIG. 4, the cloud resource server 105 establishes a data communication with the terminal device 103 used by the user via the network 104. The cloud resource server 105 may acquire at least one piece of cloud resource use information of the user via the network 104. Then, the cloud resource server 105 compares each piece of cloud resource use information with a corresponding use level threshold value, to obtain the use state information of the cloud resource corresponding to the cloud resource use information. Finally, a plurality of pieces of use state information are matched to generate the cloud resource state information of the user. The cloud resource server 105 may send the cloud resource state information to the terminal device 103, such that the user promptly and accurately understands the use state of the cloud resource selected by the user. Further, the cloud resource server 105 may also actively recommend a target cloud resource instance to the user according to the cloud resource state information. Thus, the rationality and effectiveness of the use of the cloud resource by the user are improved.

According to the method provided in the above embodiment of the present disclosure, the cloud resource use information is first acquired. Then, the cloud resource use information is compared with the use rate threshold value to obtain the comparison result, and the cloud resource use information that needs data processing is determined. Next, according to the comparison result, the use state information of the cloud resource corresponding to the cloud resource use information is obtained. The state in which the user uses the cloud resource is ascertained. Finally, the cloud resource state information is generated according to the use state information. In this way, it is conductive to improving the security when the user uses the cloud resource and the utilization rate of the cloud resource.

Figure 5:
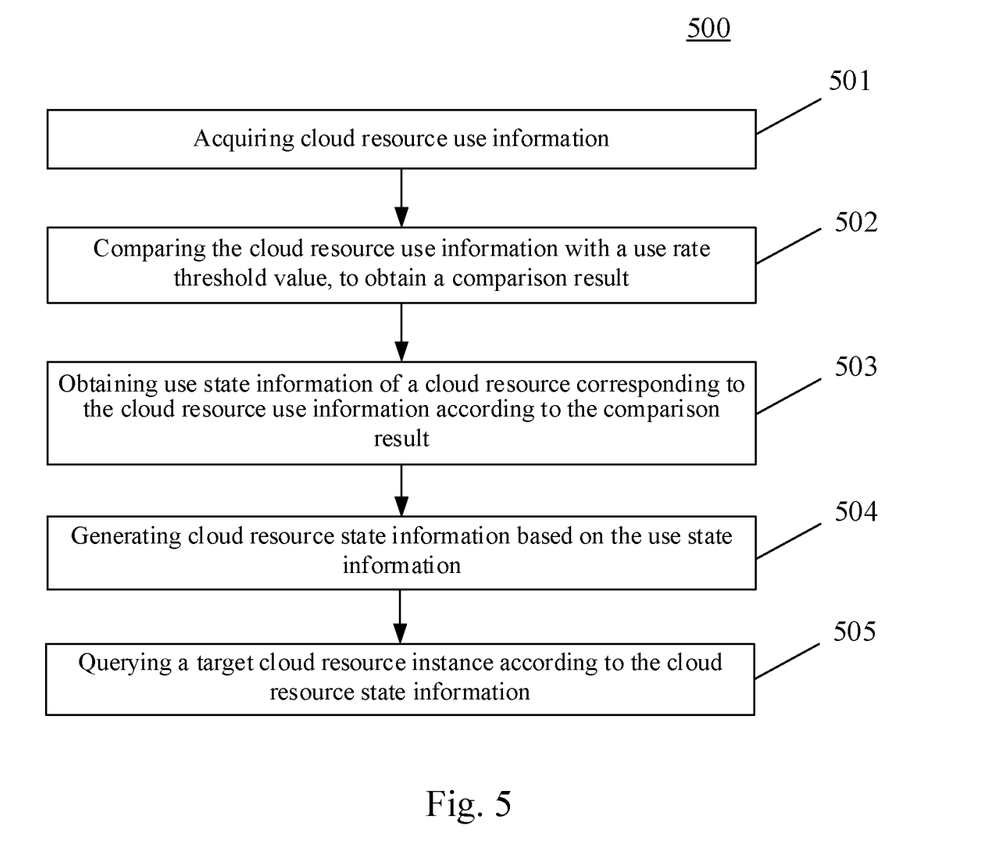
FIG. 5 is a flowchart of the method for acquiring information according to another embodiment of the present disclosure.

Further referring to FIG. 5, FIG. 5 illustrates a flow 500 of another embodiment of the method for acquiring information. The flow 500 of the method for acquiring information includes the following steps.

Step 501, acquiring cloud resource use information.

The content of step 501 is the same as that of step 201, which will not be repeatedly described here.

Step 502, comparing the cloud resource use information with a use rate threshold value, to obtain a comparison result.

The content of step 502 is the same as that of step 202, which will not be repeatedly described here.

Step 503, obtaining use state information of a cloud resource corresponding to the cloud resource use information according to the comparison result.

The content of step 503 is the same as that of step 203, which will not be repeatedly described here.

Step 504, generating cloud resource state information based on the use state information.

The content of step 504 is the same as that of step 204, which will not be repeatedly described here.

Step 505, querying a target cloud resource instance according to the cloud resource state information.

After obtaining the cloud resource state information, the executing body may query current available cloud resource instances, and ascertain the target cloud resource instance that the user may need from the available cloud resource instances according to the existing cloud resource of the user, for the user to select, thereby further improving the rationality and effectiveness of the use of the cloud resource by the user. Here, the target cloud resource instance may be an instance on the cloud resource server 105 and meeting the actual needs of the user.

Figure 6:
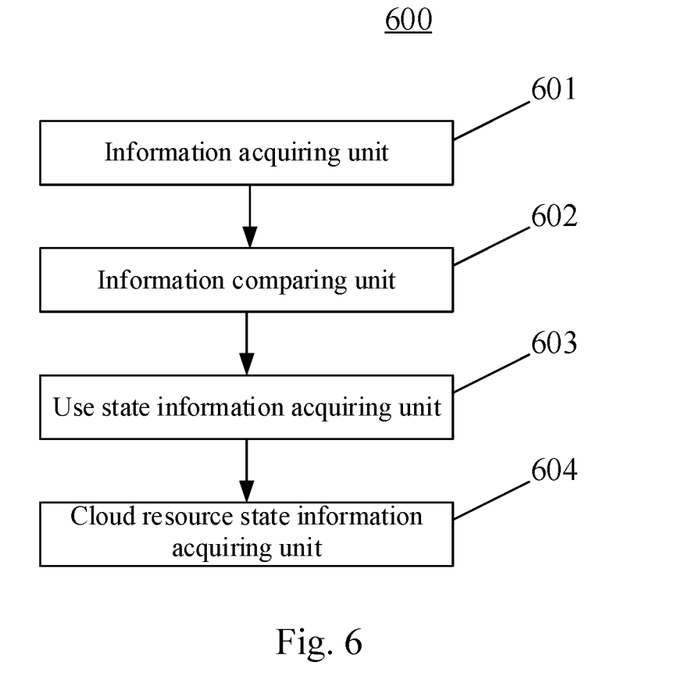
FIG. 6 is a schematic structural diagram of an apparatus for acquiring information according to an embodiment of the present disclosure.

Further referring to FIG. 6, as an implementation of the method shown in the above drawings, an embodiment of the present disclosure provides an apparatus for acquiring information. The embodiment of the apparatus may correspond to the embodiment of the method shown in FIG. 2, and the apparatus may be applied in various electronic devices.

As shown in FIG. 6, the apparatus 600 for acquiring information in this embodiment may include: an information acquiring unit 601, an information comparing unit 602, a use state information acquiring unit 603 and a cloud resource state information acquiring unit 604. Here, the information acquiring unit 601 is configured to acquire cloud resource use information, the cloud resource use information being used to represent a use rate of a corresponding cloud resource within set time. The information comparing unit 602 is configured to compare the cloud resource use information with a use rate threshold value, to obtain a comparison result. The use state information acquiring unit 603 is configured to obtain use state information of the cloud resource corresponding to the cloud resource use information according to the comparison result. The cloud resource state information acquiring unit 604 is configured to generate cloud resource state information based on the use state information.

In some alternative implementations of this embodiment, the use state information may be any one of normal, warning or high-risk. The use state information acquiring unit 603 may include: a first detecting subunit (not shown), a second detecting subunit (not shown) and a third detecting subunit (not shown). Here, the first detecting subunit is configured to mark the use state information of the cloud resource corresponding to the cloud resource use information as normal, in response to the comparison result being less than or equal to a first use level threshold value. The second detecting subunit is configured to mark the use state information of the cloud resource corresponding to the cloud resource use information as warning, in response to the comparison result being greater than the first use level threshold value and less than or equal to a second use level threshold value. The third detecting subunit is configured to mark the use state information of the cloud resource corresponding to the cloud resource use information as high-risk, in response to the comparison result being greater than the second use level threshold value.

In some alternative implementations of this embodiment, the cloud resource state information acquiring unit 604 may include: a first cloud resource state information acquiring subunit (not shown), configured to set the use state information to the cloud resource state information, in response to determining that the use state information refers to one piece of use state information.

In some alternative implementations of this embodiment, the cloud resource state information acquiring unit 604 may include: an information calculating subunit (not shown) and a second cloud resource state information acquiring subunit (not shown). Here, the information calculating subunit is configured to perform, in response to determining that the use state information refers to a plurality of pieces of use state information, a mean value calculation on the plurality of pieces of use state information to obtain use state mean value information, the use state mean value information including normal mean value information, warning mean value information and high-risk mean value information. The second cloud resource state information acquiring subunit is configured to set a product of the use state mean value information including the normal mean value information, the warning mean value information and the high-risk mean value information and a corresponding weight value to the cloud resource state information.

In some alternative implementations of this embodiment, the apparatus 600 for acquiring information may further include: a target cloud resource instance querying unit (not shown), configured to query a target cloud resource instance according to the cloud resource state information.

This embodiment further provides an electronic device, the electronic device including one or more processors and a storage device for storing one or more programs. The one or more programs, when executed by the one or more processors, cause the one or more processors to perform the method for acquiring information.

This embodiment further provides a computer readable medium storing a computer program. The program, when executed by a processor, implements the method for acquiring information.

Figure 7:
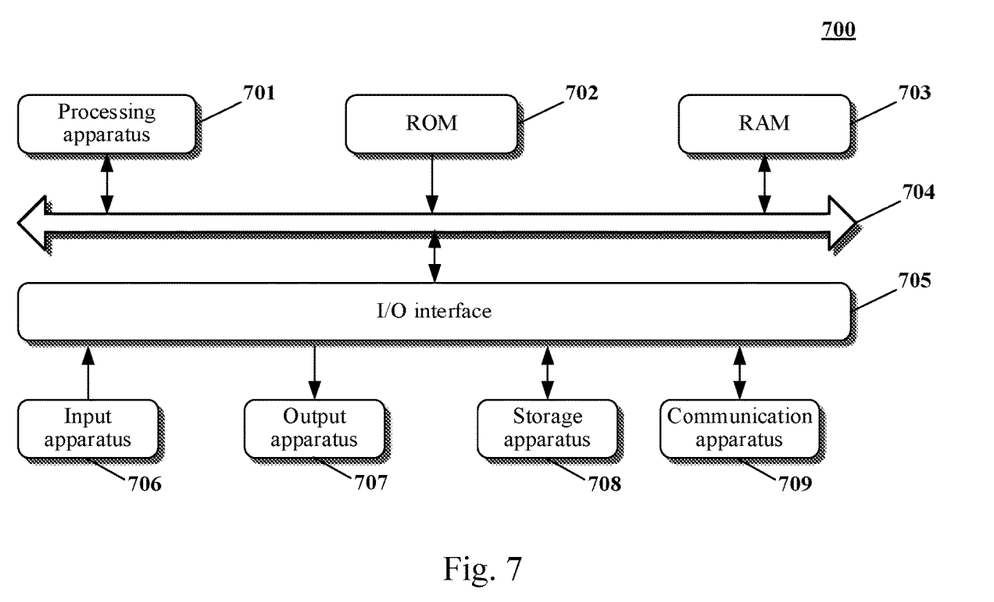
FIG. 7 is a schematic structural diagram of an electronic device adapted to implement embodiments of the present disclosure.

Referring to FIG. 7, FIG. 7 is a schematic structural diagram of a computer system 700 of an electronic device (e.g., the cloud resource server 105 in FIG. 1) adapted to implement embodiments of the present disclosure. The electronic device shown in FIG. 7 is merely an example, and should not bring any limitations to the functions and the scope of use of embodiments of the present disclosure.

As shown in FIG. 7, the electronic device 700 may include a processing apparatus (e.g., a central processing unit and a graphics processing unit) 701, which may execute various appropriate actions and processes in accordance with a program stored in a read-only memory (ROM) 702 or a program loaded into a random access memory (RAM) 703 from a storage apparatus 708. The RAM 703 also stores various programs and data required by operations of the electronic device 700. The processing apparatus 701, the ROM 702 and the RAM 703 are connected to each other through a bus 704. An input/output (I/O) interface 705 is also connected to the bus 704.

Generally, the following apparatuses may be connected to the I/O interface 705: an input apparatus 706 including, for example, a touch screen, a touch pad, a keyboard, a mouse, a camera, a microphone, an accelerometer and a gyroscope; an output apparatus 707 including, for example, a liquid crystal display (LCD), a speaker and a vibrator; the storage apparatus 708 including, for example, a magnetic tape and a hard disk; and a communication apparatus 709. The communication apparatus 709 may allow the electronic device 700 to exchange data with other devices by means of a wireless communication or a wired communication. Although FIG. 7 illustrates the electronic device 700 having various apparatuses, it should be understood that it is not required to implement or possess all of the shown apparatuses. More or fewer apparatuses may alternatively be implemented or possessed. Each block shown in FIG. 7 may represent one apparatus, or may represent a plurality of apparatuses as needed.

In particular, according to embodiments of the present disclosure, the process described above with reference to the flowchart may be implemented as a computer software program. For example, an embodiment of the present disclosure includes a computer program product, including a computer program hosted on a computer readable medium, the computer program including program codes for performing the method as illustrated in the flowchart. In such an embodiment, the computer program may be downloaded and installed from a network via the communication apparatus 709, may be installed from the storage apparatus 708, or may be installed from the ROM 702. The computer program, when executed by the processing apparatus 701, implements the above functionalities defined in the method of embodiments of the present disclosure.

It should be noted that the computer readable medium according to some embodiments of the present disclosure may be a computer readable signal medium or a computer readable medium or any combination of the above two. An example of the computer readable medium may include, but is not limited to: electric, magnetic, optical, electromagnetic, infrared, or semiconductor systems, apparatuses, elements, or a combination of any of the above. A more specific example of the computer readable medium may include, but is not limited to: electrical connection with one or more pieces of wire, a portable computer disk, a hard disk, a random access memory (RAM), a read only memory (ROM), an erasable programmable read only memory (EPROM or flash memory), an optical fiber, a portable compact disk read only memory (CD-ROM), an optical memory, a magnetic memory, or any suitable combination of the above. In some embodiments of the present disclosure, the computer readable medium may be any tangible medium containing or storing programs, which may be used by, or used in combination with, a command execution system, apparatus or element. In some embodiments of the present disclosure, the computer readable signal medium may include a data signal in the base band or propagating as a part of a carrier wave, in which computer readable program codes are carried. The propagating data signal may take various forms, including but not limited to an electromagnetic signal, an optical signal, or any suitable combination of the above. The computer readable signal medium may also be any computer readable medium except for the computer readable medium. The computer readable medium is capable of transmitting, propagating or transferring programs for use by, or used in combination with, a command execution system, apparatus or element. The program codes contained on the computer readable medium may be transmitted with any suitable medium, including but not limited to: wireless, wired, optical cable, RF medium, etc., or any suitable combination of the above.

The computer readable medium may be a computer readable medium included in the above electronic device, or a stand-alone computer readable medium not assembled into the electronic device. The above computer readable medium carries one or more programs. The one or more programs, when executed by the electronic device, cause the electronic device to: acquire cloud resource use information, the cloud resource use information being used to represent a use rate of a corresponding cloud resource within set time; compare the cloud resource use information with a use rate threshold value, to obtain a comparison result; obtain use state information of the cloud resource corresponding to the cloud resource use information according to the comparison result; and generate cloud resource state information based on the use state information.

A computer program code for executing operations in some embodiments of the present disclosure may be compiled using one or more programming languages or combinations thereof. The programming languages include object-oriented programming languages, such as Java, Smalltalk or C++, and also include conventional procedural programming languages, such as "C" language or similar programming languages. The program code may be completely executed on a user's computer, partially executed on a user's computer, executed as a separate software package, partially executed on a user's computer and partially executed on a remote computer, or completely executed on a remote computer or server. In a circumstance involving a remote computer, the remote computer may be connected to a user's computer through any network, including local area network (LAN) or wide area network (WAN), or be connected to an external computer (for example, connected through the Internet using an Internet service provider).

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion including one or more executable instructions for implementing specified logical functions. It should be further noted that, in some alternative implementations, the functions denoted by the blocks may also occur in a sequence different from the sequences shown in the figures. For example, any two blocks presented in succession may be executed substantially in parallel, or they may sometimes be executed in a reverse sequence, depending on the functions involved. It should be further noted that each block in the block diagrams and/or flow charts as well as a combination of blocks in the block diagrams and/or flow charts may be implemented using a dedicated hardware-based system executing specified functions or operations, or by a combination of dedicated hardware and computer instructions.

The units involved in embodiments of the present disclosure may be implemented by means of software or hardware. The described units may also be provided in a processor. For example, the processor may be described as: a processor including an information acquiring unit, an information comparing unit, a use state information acquiring unit and a cloud resource state information acquiring unit. Here, the names of these units do not in some cases constitute a limitation to such units themselves. For example, the cloud resource state information acquiring unit may also be described as "a unit for acquiring cloud resource state information through use state information of a cloud resource."

The above description only provides an explanation of embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the present disclosure. Technical schemes formed by the above-described features being interchanged with, but not limited to, technical features with similar functions disclosed in the present disclosure are examples.

What is claimed is:

1. A method for acquiring information, comprising:
   acquiring, by a cloud resource server providing cloud resources, cloud resource use information of a user from a terminal used by the user in response to detecting by the cloud resource server access of the user to pieces of cloud resources provided by the cloud resource server, the cloud resource use information of the user being used to represent use rates of the pieces of cloud resources within set time;
   comparing, by the cloud resource server, the cloud resource use information of the user with use rate threshold values, to obtain a comparison result;
   obtaining, by the cloud resource server, use state information of the pieces of cloud resources corresponding to the cloud resource use information of the user according to the comparison result;
   generating, by the cloud resource server, cloud resource state information of the user based on the use state information and sending the generated cloud resource state information to the user, wherein the cloud resource state information of the user represents data security of the pieces of cloud resources currently accessed by the user;
   querying, by the cloud resource server, a target cloud resource instance from the cloud resources provided by the cloud resource server according to the cloud resource state information of the user, and recommending the target cloud resource instance queried from the cloud resources provided by the cloud resource server to the user; and
   actively recommending, by the cloud resource server to the user, the target cloud resource instance based on the cloud resource state information,
   wherein the generating cloud resource state information of the user based on the use state information comprises:
   in response to determining that the use state information refers to a plurality of pieces of use state information marked as normal, warning, and high-risk, performing mean value calculations on the plurality of pieces of use state information marked as normal, warning, and high-risk respectively to obtain normal mean value information, warning mean value information, and high-risk mean value information, wherein the normal mean value is set with a first weight value, the warning mean value is set with a second weight value, and the high-risk mean value is set with a third weight value, and each of the first, second, and third weight values represents importance of a corresponding mean value; and
   calculating a sum of a product of the normal mean value and the first weight value, a product of the warning mean value and the second weight value, and a product of the high-risk mean value and the third weight value, and setting the sum as the cloud resource state information of the user.

2. The method according to claim 1, wherein the use state information is any one of normal, warning or high-risk, and
   the comparing, by the cloud resource server, the cloud resource use information of the user with use rate threshold values, to obtain a comparison result, comprises: comparing a piece of cloud resource corresponding to the cloud resource use information with the use rate threshold values, to obtain a comparison result of the piece of cloud resource corresponding to the cloud resource use information,
   the obtaining use state information of the pieces of cloud resources corresponding to the cloud resource use information according to the comparison result comprises:
   marking the use state information of a first piece of cloud resource corresponding to the cloud resource use information as normal, in response to the comparison result of the first piece of cloud resource corresponding to the cloud resource use information being less than or equal to a first use level threshold value;
   marking the use state information of a second piece of cloud resource corresponding to the cloud resource use information as warning, in response to the comparison result of the second piece of cloud resource corresponding to the cloud resource use information being greater than the first use level threshold value and less than or equal to a second use level threshold value; and
   marking the use state information of a third piece of cloud resource corresponding to the cloud resource use information as high-risk, in response to the comparison result of the third piece of cloud resource corresponding to the cloud resource use information being greater than the second use level threshold value.

3. The method according to claim 1, wherein the generating cloud resource state information of the user based on the use state information comprises:
   setting the use state information of the user as the cloud resource state information of the user, in response to determining that the use state information refers to one piece of use state information.

4. An electronic device, comprising:
one or more processors; and
a storage device, for storing one or more programs,
wherein the one or more programs, when executed by the one or more processors, cause the one or more processors to perform operations, the operations comprising:
acquiring, by a cloud resource server providing cloud resources, cloud resource use information of a user from a terminal used by the user in response to detecting by the cloud resource server access of the user to pieces of cloud resources provided by the cloud resource server, the cloud resource use information of the user being used to represent use rates of the pieces of cloud resources within set time;
comparing, by the cloud resource server, the cloud resource use information of the user with use rate threshold values, to obtain a comparison result;
obtaining, by the cloud resource server, use state information of the pieces of cloud resources corresponding to the cloud resource use information of the user according to the comparison result;
generating, by the cloud resource server, cloud resource state information of the user based on the use state information and sending the generated cloud resource state information to the user, wherein the cloud resource state information of the user represents data security of the pieces of cloud resources currently accessed by the user;
querying, by the cloud resource server, a target cloud resource instance from the cloud resources provided by the cloud resource server according to the cloud resource state information of the user, and recommending the target cloud resource instance queried from the cloud resources provided by the cloud resource server to the user; and
actively recommending, by the cloud resource server to the user, the target cloud resource instance based on the cloud resource state information,
wherein the generating cloud resource state information of the user based on the use state information comprises:
in response to determining that the use state information refers to a plurality of pieces of use state information marked as normal, warning, and high-risk, performing mean value calculations on the plurality of pieces of use state information marked as normal, warning, and high-risk respectively to obtain normal mean value information, warning mean value information, and high-risk mean value information, wherein the normal mean value is set with a first weight value, the warning mean value is set with a second weight value, and the high-risk mean value is set with a third weight value, and each of the first, second, and third weight values represents importance of a corresponding mean value; and
calculating a sum of a product of the normal mean value and the first weight value, a product of the warning mean value and the second weight value, and a product of the high-risk mean value and the third weight value, and setting the sum as the cloud resource state information of the user.

5. The electronic device according to claim 4, wherein the use state information is any one of normal, warning or high-risk, and the comparing, by the cloud resource server, the cloud resource use information of the user with use rate threshold values, to obtain a comparison result, comprises: comparing a piece of cloud resource corresponding to the cloud resource use information with the use rate threshold values, to obtain a comparison result of the piece of cloud resource corresponding to the cloud resource use information,
the obtaining use state information of the pieces of cloud resources corresponding to the cloud resource use information according to the comparison result comprises:
marking the use state information of a first piece of cloud resource corresponding to the cloud resource use information as normal, in response to the comparison result of the first piece of cloud resource corresponding to the cloud resource use information being less than or equal to a first use level threshold value;
marking the use state information of a second piece of cloud resource corresponding to the cloud resource use information as warning, in response to the comparison result of the second piece of cloud resource corresponding to the cloud resource use information being greater than the first use level threshold value and less than or equal to a second use level threshold value; and
marking the use state information of a third piece of cloud resource corresponding to the cloud resource use information as high-risk, in response to the comparison result of the third piece of cloud resource corresponding to the cloud resource use information being greater than the second use level threshold value.

6. The electronic device according to claim 4, wherein the generating cloud resource state information of the user based on the use state information comprises:
setting the use state information of the user as the cloud resource state information of the user, in response to determining that the use state information refers to one piece of use state information.

7. A non-transitory computer readable medium, storing a computer program thereon, wherein the program, when executed by a processor, causes the processor to perform operations, the operations comprising:
acquiring, by a cloud resource server providing cloud resources, cloud resource use information of a user from a terminal used by the user in response to detecting by the cloud resource server access of the user to pieces of cloud resources provided by the cloud resource server, the cloud resource use information of the user being used to represent use rates of the pieces of cloud resources within set time;
comparing, by the cloud resource server, the cloud resource use information of the user with use rate threshold values, to obtain a comparison result;
obtaining, by the cloud resource server, use state information of the pieces of cloud resources corresponding to the cloud resource use information of the user according to the comparison result;
generating, by the cloud resource server, cloud resource state information of the user based on the use state information and sending the generated cloud resource state information to the user, wherein the cloud resource state information of the user represents data security of the pieces of cloud resources currently accessed by the user;
querying, by the cloud resource server, a target cloud resource instance from the cloud resources provided by the cloud resource server according to the cloud resource state information of the user, and recommending the target cloud resource instance queried from the cloud resources provided by the cloud resource server to the user; and actively recommending, by the cloud resource server to the user, the target cloud resource instance based on the cloud resource state information, wherein the generating cloud resource state information of the user based on the use state information comprises:

in response to determining that the use state information refers to a plurality of pieces of use state information marked as normal, warning, and high-risk, performing mean value calculations on the plurality of pieces of use state information marked as normal, warning, and high-risk respectively to obtain normal mean value information, warning mean value information, and high-risk mean value information, wherein the normal mean value is set with a first weight value, the warning mean value is set with a second weight value, and the high-risk mean value is set with a third weight value, and each of the first, second, and third weight values represents importance of a corresponding mean value; and calculating a sum of a product of the normal mean value and the first weight value, a product of the warning mean value and the second weight value, and a product of the high-risk mean value and the third weight value, and setting the sum as the cloud resource state information of the user.

8. The non-transitory computer readable medium according to claim 7, wherein the use state information is any one of normal, warning or high-risk, and the comparing, by the cloud resource server, the cloud resource use information of the user with use rate threshold values, to obtain a comparison result, comprises: comparing a piece of cloud resource corresponding to the cloud resource use information with the use rate threshold values, to obtain a comparison result of the piece of cloud resource corresponding to the cloud resource use information, the obtaining use state information of the pieces of cloud resources corresponding to the cloud resource use information according to the comparison result comprises:

marking the use state information of a first piece of cloud resource corresponding to the cloud resource use information as normal, in response to the comparison result of the first piece of cloud resource corresponding to the cloud resource use information being less than or equal to a first use level threshold value;

marking the use state information of a second piece of cloud resource corresponding to the cloud resource use information as warning, in response to the comparison result of the second piece of cloud resource corresponding to the cloud resource use information being greater than the first use level threshold value and less than or equal to a second use level threshold value; and marking the use state information of a third piece of cloud resource corresponding to the cloud resource use information as high-risk, in response to the comparison result of the third piece of cloud resource corresponding to the cloud resource use information being greater than the second use level threshold value.

9. The non-transitory computer readable medium according to claim 7, wherein the generating cloud resource state information of the user based on the use state information comprises:

setting the use state information of the user as the cloud resource state information of the user, in response to determining that the use state information refers to one piece of use state information.

* * * * *